United States Patent

Spaulding et al.

[11] Patent Number: 5,946,452
[45] Date of Patent: Aug. 31, 1999

[54] PARTIALLY CORRELATED MINIMUM VISIBILITY HALFTONE PATTERNS FOR DIGITAL PRINTERS

[75] Inventors: Kevin E. Spaulding, Spencerport; Rodney L. Miller, Fairport, both of N.Y.

[73] Assignee: Eastman Kodak Company, Rochester, N.Y.

[21] Appl. No.: 08/799,954

[22] Filed: Feb. 14, 1997

[51] Int. Cl.[6] ..................................................... B41J 15/00
[52] U.S. Cl. ........................................... 395/109; 358/534
[58] Field of Search ..................................... 358/456, 534; 382/162, 237, 270; 364/518; 395/107, 109, 111, 131

[56] References Cited

U.S. PATENT DOCUMENTS

| | | | |
|---|---|---|---|
| 4,918,622 | 4/1990 | Granger et al. | 364/518 |
| 4,920,501 | 4/1990 | Sullivan et al. | 364/518 |
| 5,111,310 | 5/1992 | Parker et al. | 358/456 |
| 5,214,517 | 5/1993 | Sullivan et al. | 358/456 |
| 5,317,418 | 5/1994 | Lin | 358/456 |
| 5,341,228 | 8/1994 | Parker et al. | 358/534 |
| 5,469,515 | 11/1995 | Lin | 382/237 |
| 5,477,305 | 12/1995 | Parker et al. | 358/456 |
| 5,543,941 | 8/1996 | Parker et al. | 358/534 |
| 5,586,203 | 12/1996 | Spaulding et al. | 382/270 |
| 5,754,311 | 5/1998 | Ray | 358/456 |

FOREIGN PATENT DOCUMENTS

A 647 058 A2  4/1994  European Pat. Off. ........ H04N 1/405

*Primary Examiner*—Amelia Au
*Assistant Examiner*—Samir Ahmed
*Attorney, Agent, or Firm*—Thomas H. Close

[57] ABSTRACT

A method for halftoning a digital image having an x,y array of pixels each having an associated input pixel value, includes the steps of providing a memory containing a dither bitmap for each input pixel value of the digital image where the dither bitmaps are partially correlated; selecting a dither bitmap corresponding to the input pixel value for a pixel in said digital image; modularly addressing the selected dither bitmap with the location of said pixel to obtain an output halftone image value; and repeating steps for each pixel in the digital image.

18 Claims, 7 Drawing Sheets

PARTIALLY CORRELATED MINIMUM VISIBILITY HALFTONE PATTERNS FOR DIGITAL PRINTERS

CROSS-REFERENCE TO RELATED APPLICATIONS

The present application is related to U.S. application Ser. No. 08/658,452, filed Jun. 5, 1996, by Kevin Spaulding et al., and entitled, "METHOD FOR HALFTONING A MULTI-CHANNEL DIGITAL COLOR IMAGE"; and U.S. application Ser. No. 07/848,779, filed Mar. 10, 1992, by Lawrence A. Ray, and entitled "METHOD AND APPARATUS FOR GENERATING SIMULTANEOUSLY DERIVED CORRELATED DIGITAL HALFTONE PATTERNS".

FIELD OF THE INVENTION

This invention relates generally to the field of digital image processing and more particularly to a method for halftoning digital images for output to a digital output device.

BACKGROUND OF THE INVENTION

Halftoning is a technique that is commonly used in digital imaging to create the appearance of intermediate tones when only two colorant levels (i.e., ink or no ink) are available. Halftoning methods rely on the fact that an observer's eye will spatially average over some local area of the image so that intermediate tone levels can be created by turning some of the pixels "on" and some of the pixels "off" in some small region. The fraction of the pixels which are turned on will determine the apparent tone level. Examples of common halftoning techniques include ordered dither and error-diffusion.

Ordered dither techniques are implemented by storing either a set of dither bitmaps for a series of tone levels, or a threshold matrix that can be used to produce a set of halftone patterns. A wide variety of halftone patterns can be formed in this manner depending on the values stored in the dither bitmaps, or the threshold matrix. Common types of halftone patterns include random dither matrices, clustered-dot dither matrices, and Bayer (dispersed dot) dither matrices.

Sullivan and Miller (U.S. Pat. No. 4,920,501) have recently introduced a technique to design dither bitmaps which have minimum visual modulation. These patterns are sometimes called "blue-noise" patterns. They are desirable in that the patterns that are produced have minimum visibility to human observers, and as a result are visually pleasing relative to other patterns. The basic procedure involved in the creation of these patterns is to use an optimization technique, such as simulated annealing, to determine the arrangement of the dots in the halftone pattern that minimizes some visual cost function. One class of visual cost functions is based upon weighting the frequency components of the halftone patterns with a human visual sensitivity function.

Figure 1:
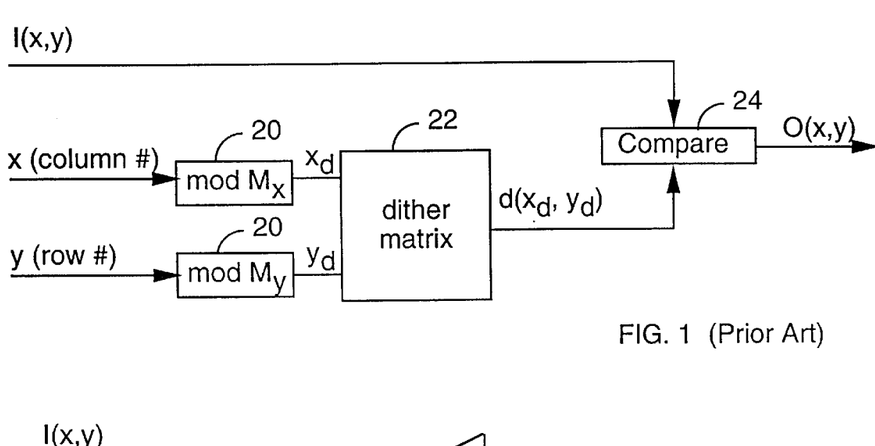
FIG. 1 is a schematic diagram illustrating a prior art halftoning method employing dither bitmaps.

The method of Sullivan and Miller can be implemented using the process shown in FIG. 1. In this case a set of dither bitmaps 12 are used corresponding to the halftone patterns determined for each tone level k. A given pixel in the image has column and row addresses x and y, respectively, and an input pixel value I(x,y). The input pixel value is the code value associated with a particular tone level. For each x-y pixel location in the image, the input pixel value I(x,y) is used to select which of the dither bitmaps should be used for that pixel. Modulo operators 10 are used to determine indices $x_d$ and $y_d$ that are used to address the selected dither bitmap to determine the output pixel value O(x,y).

For the method described by Sullivan and Miller, the halftone patterns for each tone level are derived independently, and are therefore uncorrelated. This is acceptable for image areas that contain only a single tone level. However, for image regions that contain smooth gradients from one tone level to another, undesirable artifacts occur at the transitions between the tone levels. These artifacts manifest themselves as an increased image graininess which enhances the visibility of the halftone patterns. To eliminate this problem, Sullivan and Ray (U.S. Pat. No. 5,214,517) have disclosed an enhancement to this basic method that insures that the bitmaps for each of the tone levels are correlated with each other. By "correlated" it is meant that once a certain pixel in the dither bitmap is turned on (e.g. set to print black) at a certain input pixel value, it will remain the same, i.e. turned on, in the dither bit maps for all darker input pixel values. This effectively eliminates the undesirable artifacts at the transitions between the tone levels. Other extensions to this basic approach include a method for simultaneously optimizing the bit maps for all of the tone levels (see U.S. application Ser. No. 07/848,779, filed by L. A. Ray); a method for designing blue-noise dither matrices for use with multi-level output devices (see U.S. Pat. No. 5,586,203, issued Dec. 17, 1996 to Spaulding et al.), and a method for jointly designing dither matrices for each color channel of a color image (see U.S. application Ser. No. 08/658,452 by Spaulding et al.).

Figure 2:
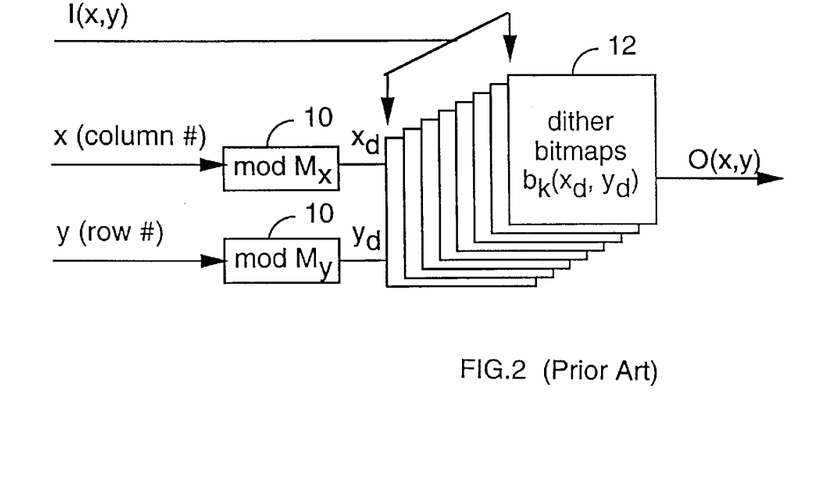
FIG. 2 is a schematic diagram illustrating a prior art halftoning method employing a dither matrix.

The correlated halftone patterns can be implemented using the same dither bitmap method that was shown in FIG. 1. Alternatively, Granger et al. (U.S. Pat. No. 4,918,622) have shown that a threshold matrix approach can also be used interchangeably with the dither bitmap so long as the patterns are correlated. In this case, the threshold matrix indicates the tone level at which each pixel turns on. A flow chart for this approach is shown in FIG. 2. A given pixel in the image has column and row addresses x and y, respectively, and an input pixel value I(x,y). Modulo operators 20 are used to determine indices $x_d$ and $y_d$ that are used to address the dither matrix 22. The threshold value $d(x_d,y_d)$ stored in the dither matrix at this address is then compared to the input pixel value I(x,y) using a comparator 24. If the input pixel value is below the threshold value, the output pixel value O(x,y) is set to "off"; if the value is above the threshold, the output pixel value O(x,y) is set to "on".

Figure 3:
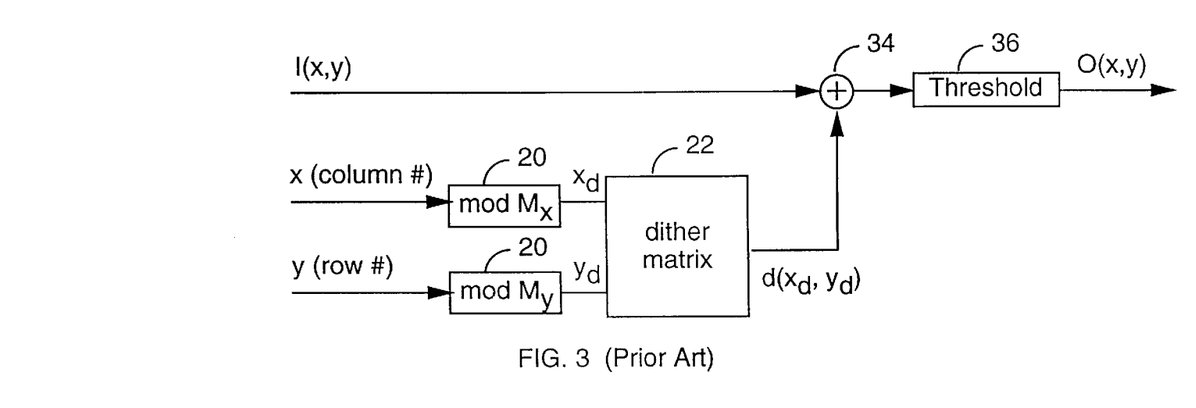
FIG. 3 is a schematic diagram illustrating another prior art halftoning method employing a dither matrix.

Another implementation of this basic technique is shown in FIG. 3. In this case the threshold value $d(x_d,y_d)$ is combined with the input pixel value I(x,y) using an adder 34. A threshold operator 36 is then used to threshold the combined value to determine the output pixel value O(x,y).

It should be noted that any dither pattern which can be implemented using the methods of FIG. 2 and FIG. 3 can also be implemented using the method of FIG. 1. However, it is possible to define a set of dither bitmaps for the method of FIG. 1 that could not be implemented using the other methods. This is because in the dither matrix implementations once a certain pixel is turned on at the input pixel value corresponding to the threshold, it will stay on for all higher input pixel values. With the dither bitmaps approach this constraint is not present. For example, a certain pixel could be "off" for an input pixel value of 150, "on" for an input pixel value of 151, and "off" again for an input pixel value of 152. In other words the dither bitmap approach can produce either correlated or uncorrelated halftone patterns, whereas the dither matrix approaches can only produce correlated halftone patterns.

Parker and Mitsa (U.S. Pat. No. 5,111,310), Lin (U.S. Pat. Nos. 5,317,418 and 5,469,515) and Barton, (European patent application 0 647 058 A2, application date Apr. 5, 1995) have also recently introduced techniques for the design of dither patterns. Although the actual optimization methods that they have used is somewhat different, the resulting patterns are quite similar to those created using the methods described in the Sullivan et al. patents.

As discussed above, the use of correlated blue-noise halftone patterns eliminates the noise artifacts that occur on the boundaries between different tone levels when uncorrelated blue-noise halftone patterns are used. However, the halftone pattern generated for any single tone level will generally be somewhat less optimal than that produced with uncorrelated bitmaps. This is a result of the fact that once a dot is turned "on" for one tone level, it must be left on for all higher tone levels. Thus this provides many fewer degrees of freedom in the halftone pattern optimization process. There is a need therefore for a halftoning method that eliminates the noise artifacts on the boundaries between different tone levels, without imposing the quality compromise associated with the correlated dot pattern solution.

SUMMARY OF THE INVENTION

The present invention represents a method for halftoning a digital image having an x,y array of pixels each having an associated input pixel value, comprising the steps of providing a memory containing a dither bitmap for each input pixel value of the digital color image where the dither bitmaps are partially correlated, selecting the dither bitmap corresponding to the input pixel value for a pixel in said digital image, and modularly addressing the selected dither bitmap with the location of said pixel to obtain an output halftone image value for each pixel in the digital image.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage over prior art methods of applying minimum visibility dither patterns to images in that it uses partially correlated dither bitmaps. As a result, it is possible to produce halftone patterns that are more optimal than those associated with the fully correlated dither bitmap techniques, without introducing the objectionable artifacts that are associated with the uncorrelated dither bitmaps approach.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The present invention comprises a method to halftone an image for an imaging device using a set of dither bitmaps designed to minimize the visibility of halftone patterns generated using the dither matrices. The halftone patterns for different tone levels are partially correlated with each other with an associated correlation interval. By "partially correlated" it is meant that the dither bitmap for any particular tone level is more correlated with dither bit maps at adjacent tone levels and less correlated with dither bitmaps at more distant tone levels, i.e. once a pixel is turned on, it is more likely to remain on for nearby tone levels, and less likely to remain on for more distant tone levels. Similarly, once a pixel is turned off, it is more likely to remain off for nearby tone levels.

Figure 4:
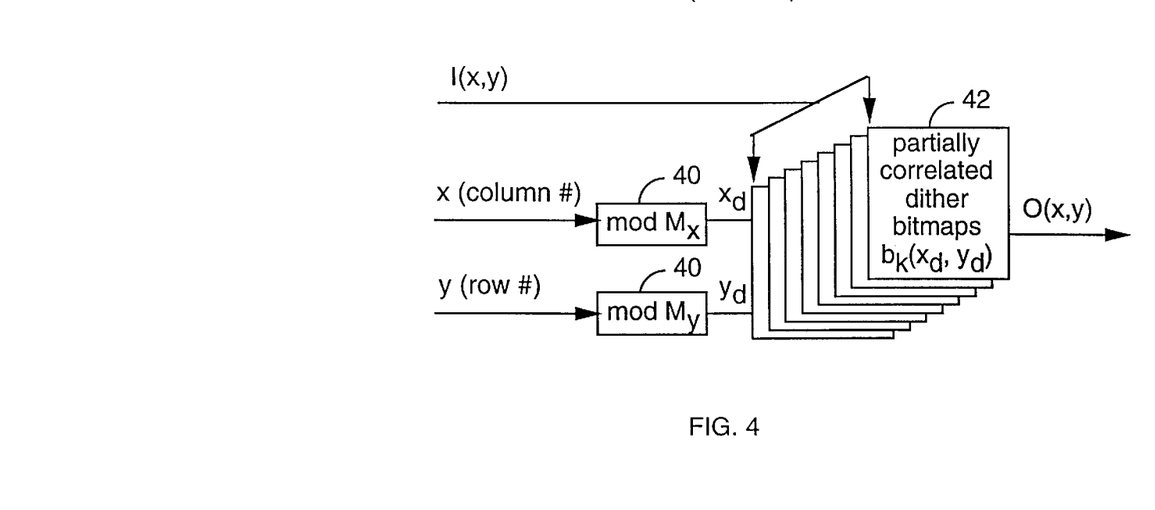
FIG. 4 is a schematic diagram illustrating a halftoning method according to the present invention.

With reference to FIG. 4, a preferred embodiment of this invention is shown. This method is identical with that shown in FIG. 1, except that halftone patterns for each tone level k are specified by a set of partially correlated dither bitmaps 42. The size of the dither bitmaps are $M_x$ by $M_y$. A given pixel in the image has column and row addresses x and y, respectively, and an input pixel value I(x,y). For each x-y pixel location in the image, the input pixel value I(x,y) is used to select which of the dither bitmaps should be used for that pixel. Modulo operators 40 are used to determine indices $x_d$ and $y_d$ that are used to address the selected dither bitmap to determine the output pixel value O(x,y).

In a preferred embodiment, the partially correlated dither bitmaps 42 are designed so as to provide an output image having halftone patterns with minimum visibility to a human observer. Such patterns are one type of random non-deterministic, non-white noise patterns. The dither bitmaps for each tone level are designed so that they are partially correlated with the dither bitmaps for other tone levels with an associated correlation interval, L. In a preferred embodiment of this invention, the output pixel value for a particular $x_d$-$y_d$ pixel location in the dither bitmaps is allowed to change only once for the input levels within the correlation interval. For example, if the output value associated with the pixel location $x_d$=2, $y_d$=6 changes from a 0 to a 1 at input level 85, it would not be permitted to change again within the input level range of 85−L to 85+L.

Figure 5:
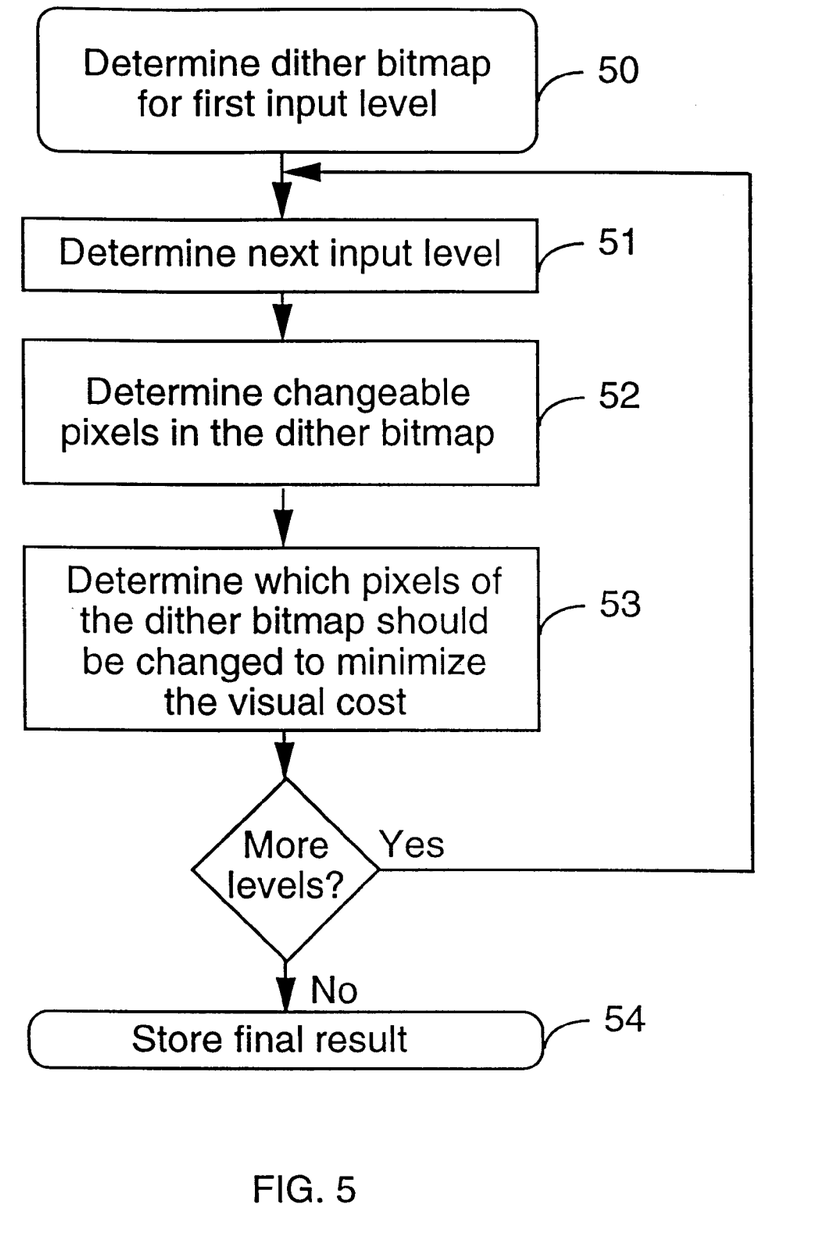
FIG. 5 is a flow chart illustrating the steps employed to determine the partially correlated dither bitmaps of the present invention.

One method that can be used to determine the partially correlated dither bitmaps is shown in FIG. 5. In this case, the dither bitmaps for each of the input levels are determined sequentially. The steps involved in this method will first be summarized, and then each step will be described in more detail:

1. A dither bitmap for a first input level is determined (50).

2. The next input level is determined in the sequence of input levels (51).

3. The changeable pixels in the dither bitmap are determined (52). This step involves the use of the correlation interval.

4. The pixels that should be changed to minimize the visual cost are determined (53).

5. Steps 2–4 are repeated for each of the input levels in the sequence of input levels.

6. Lastly, the final set of dither bitmaps is stored in a memory (54.)

Each of the steps in the method shown in FIG. 5 will now be described in more detail with reference to a preferred embodiment. The first step in the method is to determine a dither bitmap for a first input level. Any input level can be chosen to be the first input level, but it has been found that the best results are generally obtained when the first input level corresponds to a midtone level. For example, if the input levels are in the range of 0 to 255, a good choice for the first input level would be in the range of 64 to 192. The dither bitmap for the first input level can be determined by choosing a halftone pattern from an existing dither matrix, or can be determined by using one of the many prior art dither bitmap optimization methods.

Figure 6:
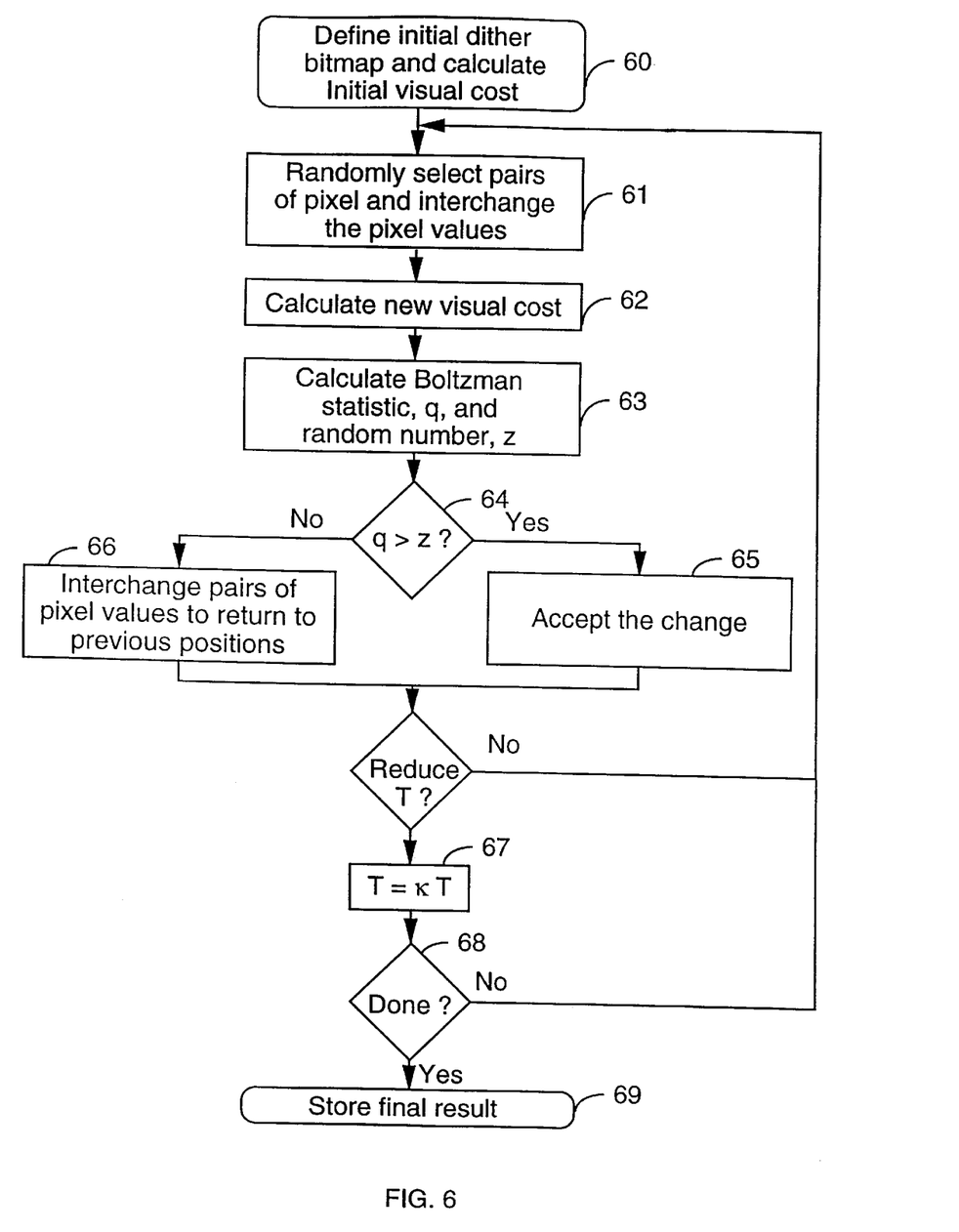
FIG. 6 is a flow chart illustrating a simulated annealing process used to optimize the partially correlated dither bitmaps of the present invention.

In a preferred embodiment of this invention, the first dither bitmap is determined using a stochastic annealing optimization algorithm, similar to that described by Sullivan et al. (U.S. Pat. No. 4,920,501). With reference to FIG. 6, the steps involved in one implementation of a stochastic annealing optimization algorithm will be described:

1. An initial dither bitmap is defined, and a corresponding initial visual cost value is calculated (60). The dither bitmap is comprised of a pixel value for each pixel location in the dither bitmap. The initial dither bitmap can be formed randomly, or alternatively some other dither bitmap can be used. The initial visual cost will temporarily be known as the "old visual cost."

2. Pairs of pixels in the dither bitmap are randomly selected and their pixel values are interchanged to form a new dither bitmap (61). In some cases, a single pair of pixel values can be selected from the dither bitmap. Alternatively, two or more pairs of pixel values can be selected.

3. A new visual cost value is computed for the new dither bitmap (62).

4. A Boltzman test statistic q, and a random number z between 0 and 1 are calculated (63), where q is given by:

$$q = \exp\left(-\frac{\Delta \text{cost}}{T}\right) \quad (1)$$

where Δcost=(new visual cost)−(old visual cost), and the parameter T is set initially so that a large percentage, e.g. 80%, of new dither bitmaps will be accepted in the following step, even if Δcost>0.

5. The value of q is then compared to z (64). If q>z the new dither matrices are kept (65) and the new visual cost computed in step 3 is renamed as the old visual cost; if q≦z, the dither bitmap is returned to its previous state (66).

6. After many iterations of steps 2–5 above, e.g., 1000, reduce the parameter T to kT (67), where k<1, e.g. k=0.95.

7. When T is sufficiently small so that the visual costs at successive values of T are no longer changing significantly, or after a fixed number of changes have been made to T, e.g., 500, the process is done (68) and the final dither bitmaps are stored in a memory (69).

An important step in the process of determining the optimum dither bitmap is the computation of the visual cost. The visual cost relates to the visibility of the halftone patterns to a human observer. In order to compute the visual cost, it is necessary to define a visual cost function. Many different visual cost functions can be used to compute the approximate visibility of a halftone pattern. In a preferred embodiment of the present invention, a visual cost function is used that involves calculating a weighted integral of the dither bitmap's frequency spectrum. Consider a dither bitmap b(x,y) where the pixel values for each pixel location are either 0 or 1 corresponding to whether a dot is to be printed at that location or not. The frequency spectrum of the dither bitmap $B(f_x,f_y)$ is determined by Fourier transforming the dither bitmap. The frequency spectrum is then weighted by the human visual system sensitivity as a function of spatial frequency $V(f_x,f_y)$ to compute a weighted luminance spectrum. A visual cost value, which is an estimate of the visibility of the halftone pattern, is then computed by integrating a function of the weighted luminance spectrum over all frequencies. One particular form of the cost function that can be used is $$\cos t = \int\int |B(f_x,f_x)V(f_x,f_x)|^2 df_x df_y \quad (2)$$

Since the luminance distribution is typically specified for a discrete set of pixel values, it is frequently useful to work with a discrete form of this cost function $$\cos t = \sum_{i=0}^{M_x-1} \sum_{j=0}^{M_y-1} |B_{ij}V_{ij}|^2 \quad (3)$$

where $B_{ij}$ is the (i,j)th element of the discrete Fourier transform of the dither bitmap, and $V_{ij}$ is the human visual system sensitivity for the frequency corresponding to element (i,j).

One function that can be used to approximate the low-contrast photo-optic human visual system sensitivity is $$V(f_x, f_y) = \begin{cases} a(b+c\tilde{f})\exp(-(c\tilde{f})^d) & \tilde{f} > f_{\max} \\ 1.0 & \text{otherwise} \end{cases} \quad (4)$$

where the constants a, b, c, and d are calculated from empirical data to be 2.2, 0.192, 0.114, and 1.1 respectively, $\tilde{f}$ is the normalized radial spatial frequency in cycles/degree of visual subtense, and $f_{max}$ is the frequency at which the weighted exponential peaks. To account for variations on the human visual function sensitivity, the normalized radial spatial frequency is computed from the actual radial spatial frequency using an angular-dependent scale function $$\tilde{f} = \frac{f}{s(\theta)} \quad (5)$$

where $$f = \sqrt{f_x^2 + f_y^2} \quad (6)$$

and s(θ) is given by $$s(\theta) = \frac{1-w}{2}\cos(4\theta) + \frac{1+w}{2} \quad (7)$$

with w being a symmetry parameter, and $$\theta = \arctan\left(\frac{f_y}{f_x}\right) \qquad (8)$$

Other functional forms, such as a Gaussian approximation, can also be used to represent the human visual system sensitivity.

Many times it is more convenient to compute the value of the cost in the spatial domain rather than transforming the luminance distribution to the frequency domain. In this case, by applying the well-known Parseval's Theorem to Eq. (1), it can be seen that the visual cost can also be computed by $$\cos t = \int\int |b(x,y)*v(x,y)|^2 dx\,dy \qquad (9)$$

where * indicates the convolution operation, b(x,y) is the dither bitmap, and v(x,y) is the inverse Fourier transform of the human visual system sensitivity and can be interpreted as the human visual system point spread function. The discrete form of this cost function is $$\cos t = \sum_{i=0}^{M_x-1} \sum_{j=0}^{M_y-1} |(b*v)_{ij}|^2 \qquad (10)$$

where $(b*v)_{ij}$ is the (i,j)th element of the perceived dither bitmap given by discrete convolution of the dither bitmap with the human visual function system point spread function. It should be noted that since the halftone pattern generated by an ordered dither process will be periodic, the discrete convolution must take this fact into account by including contributions from surrounding repetitions of the dither bitmap.

As an alternative to using the simulated annealing optimization technique that was just described, other types of combinatorial optimization techniques such as those referred to as genetic algorithms can also be used to determine the first dither bitmap. For a generic description of these algorithms see David E. Goldberg, *Genetic Algorithms in Search, Optimization, and Machine Learning*, Addison-Wesley Publishing Company, Inc., 1989, and Gregory J. E. Rawlings, *Foundations of Genetic Algorithms*, Morgan Kaufmann Publishers, 1991. Generally, any optimization method that is used will be adapted to minimize the chosen visual cost function.

Once the dither bitmap for the first input level is determined, the second step in the process shown in FIG. 5 is to determine the next input level in the sequence of input levels (51). The dither bitmap for each input level may be determined using a consecutive sequence, or alternatively using other types of sequences. In the preferred embodiment of this invention, a consecutive sequence is used. For example, consider the case where the first input level that is initially determined is level 128 (out of 256 possible input levels). A consecutive sequence could be used where the input levels were optimized in the following order: 127, 126, . . . , 1, 0, 129, 130, . . . , 254, 255. In this case, the input levels are sequentially reduced from 127 to 0, and then increased from 129 to 255.

The next step in the process shown in FIG. 5 is to determine the changeable pixels in the dither bitmap (52). In the prior art correlated dither bitmap methods, this is generally this is done by finding the pixels which are "off" in the halftone pattern corresponding to the nearest input level below the current input level that has already been optimized, and are "on" in the halftone pattern corresponding to the nearest input level above the current input level that has already been optimized. However, in the present invention a correlation length L is used in the process of making this determination. In the preferred embodiment of this invention, any pixel where the pixel value has not changed within the correlation interval L is deemed to be a changeable pixel. More specifically, if k is the current input level a pixel is eligible to be changed only if the pixel value has not already been changed in the interval of k−L to k+L. The correlation interval L specifies the tone level difference within which the halftone patterns will be correlated. The correlation interval should be chosen to be large enough so that the difference in tone level across an edge in an image which is larger than the correlation interval will mask the visibility of any increased graininess on the boundary. On the other hand, if the correlation interval is chosen to be too large the benefit of the partially correlated dot patterns will be minimal relative to fully correlated dot patterns. A suggested correlation interval is about 64, but larger or smaller values may also be appropriate.

Figure 7:
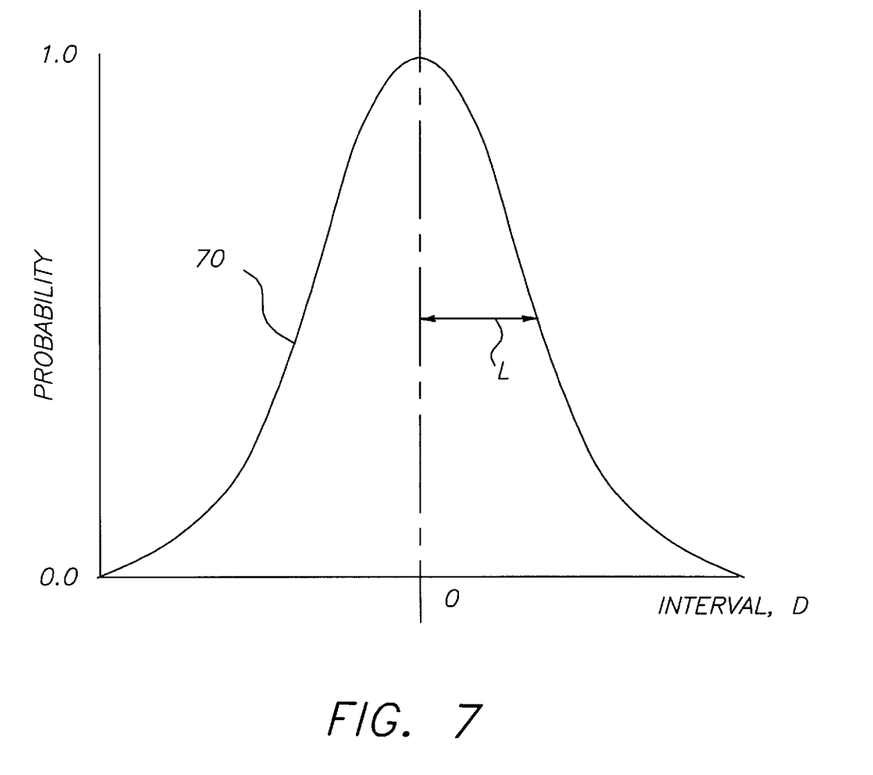
FIG. 7 is a graph showing a Gaussian probability function employed in the method of the present invention.

In an alternate embodiment of the present invention, the probability that the pixel at a particular $x_d$-$y_d$ pixel location in the dither bitmaps will not be changeable is reduced as the tone levels are increasingly farther away from a tone level where the output pixel value changed. The relationship between the probability that the pixel will not be changeable and the interval between the current input level and the nearest input level where the pixel value changed defines a probability function. The relative width of the probability function is associated with the correlation interval L. An example of a Gaussian probability function 70 is shown in FIG. 7. When determining whether a pixel should be considered to be a changeable pixel, the interval D between the current input level, and the nearest input level where the pixel value for that pixel changed is determined. The interval D can then be used to compute a probability that the pixel will not be changeable using the probability function. A uniformly distributed random number z between 0 and 1 can then be calculated and compared to the probability value. If z is larger than the probability value, the pixel is said to be a changeable pixel.

It can be seen that the first embodiment that was discussed where the pixel was changeable only if it the interval between the current input level and the nearest input level where the pixel value changed was larger than L is actually a special case of the probability function approach. In that case, the associated probability function is 1.0 when |D|<L and 0.0 when |D|>L.

The next step in the process shown in FIG. 5 is to determine which of the changeable pixels in the dither bitmap should be changed in order to minimize the visual cost (53). When going from one input level in the sequence to the next input level in the sequence, it is necessary to have a net change in the number of pixels in the dither bitmap that are "on" or "off" corresponding to the difference in the number of dots in the halftone pattern that are needed to produce the desired tone level. For example, if 128×128 dither bitmaps are being computed a net change of 64 (=128×128/256) pixels is typically needed for two consecutive input levels. Therefore if the first input level was 128 and the next input level in the sequence was 127, 64 fewer ones (and 64 more zeros) would be needed in the optimized dither bitmap relative to the dither bitmap for level 128. In the fully correlated dither bitmap case, only these 64 pixels would be changed. However, in the method of the present invention some pixels that are zeros can be changed to ones, in addition to changing some pixels that are ones to zeros.

At the end of the optimization process, the requirement is that the final net change, Δnet, in the number of ones and zeros be equal to the net change appropriate to obtain the desired tone level:

$$\Delta net = \Delta ones - \Delta zeros \qquad (11)$$

where Δones is the number of zeros changed to ones, and Δzeros is the number of ones changed to zeros.

The process of determining which of the changeable pixels in the dither bitmap should be changed in order to minimize the visual cost (53) can be accomplished using a number of different methods. In one embodiment of the present invention, a variation of the simulated annealing algorithm described above with reference to FIG. 6 can be used. In this case, the initial dither bitmap can be determined (60) by randomly changing some of the pixels in the dither bitmap for the previous input level in the sequence of input levels to produce the desired net change in the number of pixels that are "on." Alternatively, the pixels can be changed according to some other strategy. For example, the pixels can be changed one-by-one, choosing the pixels that produce the dither bitmap with the lowest visual cost. This is essentially a "steepest-descent" technique. It is also necessary to modify the step of randomly selecting pairs of pixels and interchanging the pixel values (61). In this case, the pixels to be interchanged would be chosen only from the set of changeable pixels.

Other methods could also be used to determine which of the changeable pixels in the dither bitmap should be changed in order to minimize the visual cost (53). For example, a steepest-descent optimization process can be used. With this approach, the pixels are changed one-by-one, choosing the pixels that produce the dither bitmap with the lowest cost in each case. As discussed above, it is desirable to change both some of the zeros and some of the ones in order to produce partially correlated dither bitmaps. Therefore, it is necessary to decide how many pixels should be changed during the optimization process. In one embodiment of the present invention, a fixed number of pixels above the desired net change is used. For example, if a net change of 64 additional zeros is needed. The number of ones that are changed to zeros would be 64+N, and the number of zeros that are changed to ones would be N, where N is the fixed number of pixels above the desired net change. The pixels could be changed in a number of different sequences. For example, if N=64 all 128 (=64+N) of the ones could be changed to zeros first, and then 64 of the zeros could be changed to ones. Alternatively, two of the ones could be first changed to zeros, followed by changing one of the zeros to a one. This mini-sequence could then be repeated 64 times for a net change of 64 additional zeros.

Two particular optimization methods for determining which pixels of the dither bitmap should be changed in order to minimize the visual cost have been described. One method was based on a simulated annealing technique. The other one was based on a steepest-descent optimization technique. Other classes of optimization methods could also be used. For example a sequential constraint method like that described by Parker et al. can also be used to determine the minimum visibility halftone patterns. When large dither matrices are being optimized many of these techniques have been found to take a large amount of processing time to complete even with very powerful computers. For this reason, it is sometimes desirable to use other optimization techniques that will converge more quickly, even if the final solution is slightly less optimal than could be found with the slower techniques.

One such technique involves defining a new form of cost function. Consider a dither bitmap b(x,y). The perceived dither bitmap can be computed by convolving the dither bitmap with an approximation of the point spread function of the human visual system, b(x,y)*v(x,y). If it is now desired to determine the optimum halftone patterns for the next input pixel value in the sequence, it will be necessary to add/subtract an appropriate number of dots from the halftone pattern as discussed above. It is intuitive that the dots will typically be added to pixel locations where the perceived dither bitmap value is high, or conversely will be subtracted from pixel locations where the perceived dither bitmap value is low. (Corresponding to the brightest and darkest positions in the perceived dither bitmap.) It is therefore possible to achieve approximately the same result by adding dots at the pixel locations having the maximum perceived dither bitmap value, or subtracting dots at the pixel locations having the minimum perceived dither bitmap value. If more than one dot needs to be added or subtracted, the dots should generally be added/subtracted one at a time and the perceived dither bitmap recomputed after each step. This process is essentially equivalent to defining a new cost function that penalizes large peaks and valleys in the perceived dither bitmap.

It will be obvious to one skilled in the art that there are many variations of the above disclosed embodiments that could be used to produce approximately equivalent results. In particular, there are many variations of cost functions that could be defined that penalize halftone patterns that are more visible to the human observer. Additionally, there are many different types of optimization techniques that can be employed to minimize the given cost functions. Further, even within the particular embodiments that we have discussed there are countless variations in the details such as the order that the halftone patterns are optimized.

The optimization methods discussed above assume that the output device that is used to produce images with the optimized halftone patterns will produce ideal images with perfectly registered non-overlapping dots. For many devices, this assumption may be sufficiently close to reality that the resulting halftone patterns are near-optimum. In other devices, the failure to accurately model the characteristics of the output image can result in sub-optimal performance since the computed cost value associated with the visibility of the halftone patterns may be inaccurate. To correct this deficiency, the above methods can be modified to more accurately reflect the actual device characteristics during the step of calculating the visibility of the dither bitmaps. The cost function can be modified in a number of ways to more accurately reflect the visibility of the halftone patterns.

Figure 8A:
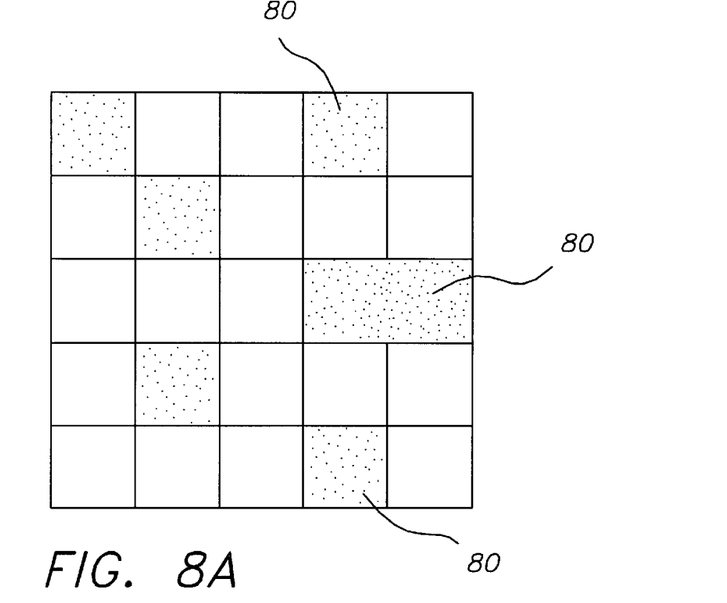
FIGS. 8a and b are diagrams showing an ideal and an actual dot pattern respectively.
Figure 8B:
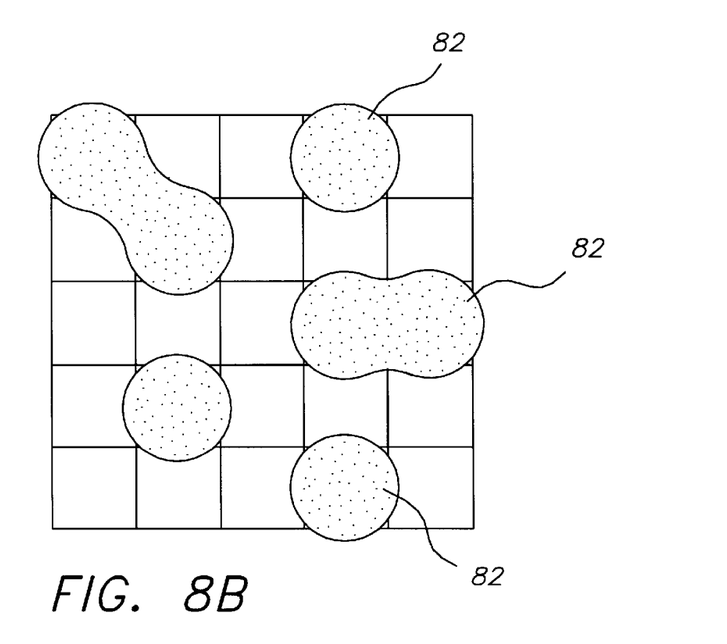

One example of a more accurate cost function is to use more sophisticated halftone dot models to account for the actual dot shapes/sizes and/or the interactions between nearby dots. In this case, the dither bitmap would be used to determine a halftone pattern that would more accurately reflect the actual dot pattern created on the output device. For example, FIGS. 8A and B illustrate the difference between an ideal dot pattern (FIG. 8A) and a dot pattern more accurately reflecting the device characteristics for a hypothetical output device (FIG. 8B). The most accurate device models will account for the dot interactions between dots, as well as the dot placement accuracy of the output device.

Figure 9:
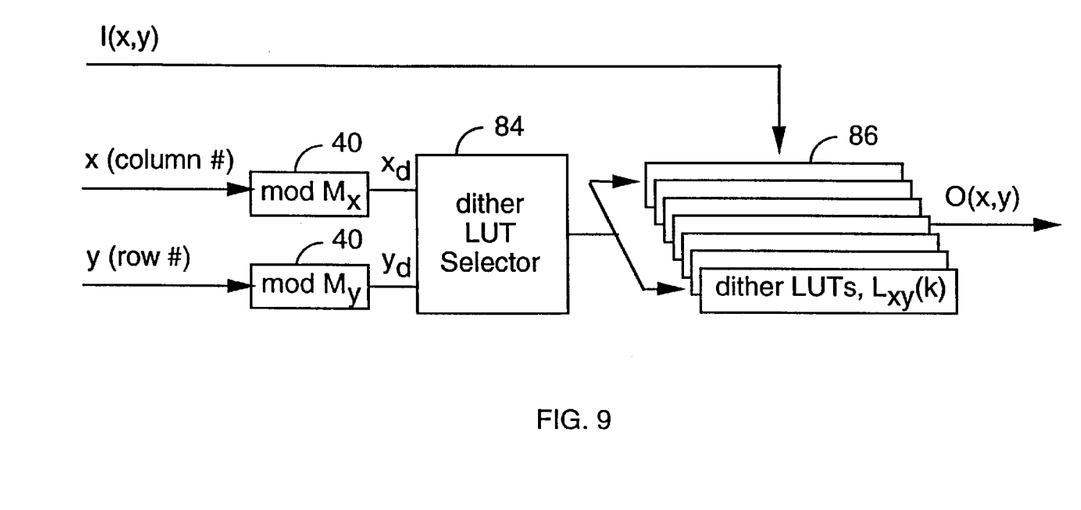
FIG. 9 is a schematic diagram illustrating a halftoning method according to the present invention employing partially correlated dither LUTs.

It should be noted that the basic method of the present invention can be implemented with a variety of configurations. For example, FIG. 9 illustrates an alternate embodiment which uses dither look-up tables (LUTs) that produce partially correlated halftone patterns as opposed to dither bitmaps. This embodiment can be used to provide identical results to those obtained with the preferred embodiment shown in FIG. 4. In this case, the partially correlated halftone patterns are stored as a set of dither LUTs, one for each pixel position in the dither matrix, rather than being stored as a set of dither bitmaps, one for each input pixel value. A given pixel in the image has column and row addresses x and y, respectively, and an input pixel value I(x,y). For each x-y pixel location in the image, modulo operators 40 are used to determine indices $x_d$ and $y_d$ that are used to address a dither LUT selector 84. The dither LUT selector selects one of a set of dither LUTs 86 corresponding to the pixel location. The selected dither LUT is then addressed by the input pixel value I(x,y) to determine the output pixel value O(x,y).

The method of the present invention can also be extended to color output devices. In this case, independent dither bitmaps can be calculated for each color channel. Alternatively spatially shifted or inverted dither bitmaps can be used for each color channel. More preferably, methods like those described by Spaulding et al in U.S. application Ser. No. 08/658,452, can be used to jointly optimize the dither bitmaps for each color channel.

Figure 10:
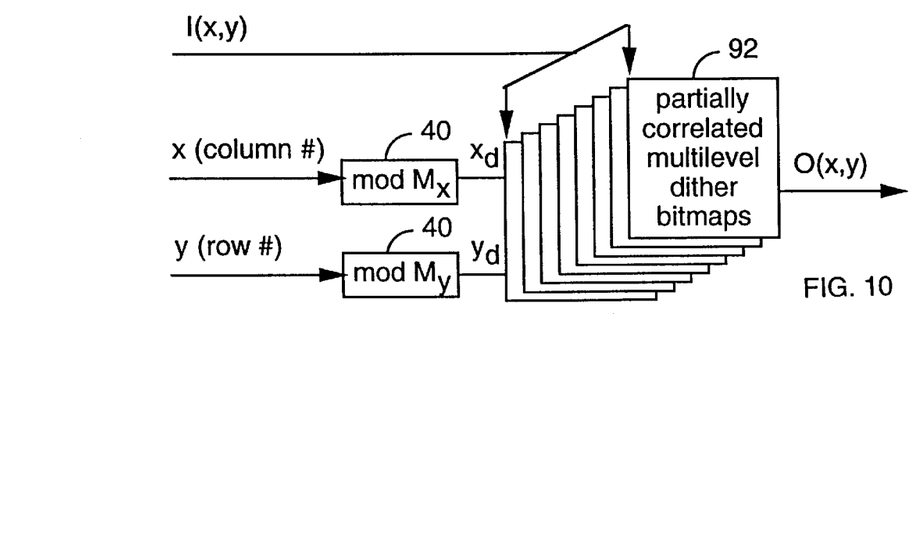
FIG. 10 is a schematic diagram illustrating a multilevel halftoning method according to the present invention.

The method of the present invention can also be extended to produce images for multi-level output devices having more than two available output levels. Only a slight modification to the basic method shown in FIG. 4 is necessary. FIG. 10 shows a configuration that can be used to produce partially correlated halftone patterns for a multi-level device. In this case, the partially correlated dither bitmaps 42 of FIG. 4 have been replaced with partially correlated multilevel dither bitmaps 92. These multilevel dither bitmaps store the output level to be used as a function of pixel location for each input level. Whereas the partially correlated dither bitmaps 42 stored only zeros or ones corresponding to whether a dot was to be printed or not, the partially correlated multilevel dither bitmaps 92 store a value that indicates which of the available output levels should be printed. The partially correlated multilevel dither bitmaps 92 can be designed using methods analogous to those described above for the case of the binary output device.

In the simplest case, a set of binary partially correlated dither bitmaps can be used to populate the partially correlated multilevel dither bitmaps by treating each interval between the multiple output levels as a binary halftoning problem. For example, consider a multi-level output device having three output levels: white (level 0), gray (level 1) and black (level 2). The input pixel values between white and gray can be reproduced by using a set of binary partially correlated dither bitmaps to assign pixels to level 0 or level 1. Likewise, the input pixel values between gray and black can be reproduced by using a set of binary partially correlated dither bitmaps to assign pixels to level 1 or level 2. Either the same set or different sets of binary partially correlated dither bitmaps can be used for each interval. The partially correlated multilevel dither bitmaps can be designed to store the resulting values. It is also possible to directly design a set of partially correlated multilevel dither bitmaps 92 using optimization techniques analogous to those discussed above rather than building them from a set of binary partially correlated dither bitmaps.

The invention has been described with reference to a preferred embodiment. However, it will be appreciated that variations and modifications can be effected by a person of ordinary skill in the art without departing from the scope of the invention.

PARTS LIST 10 modulo operators
12 dither bitmaps
20 modulo operators
22 dither matrix
24 comparator
34 adder
36 threshold operator
40 modulo operators
42 partially correlated dither bitmaps
50 determine first step dither bitmap
51 determine next input level step
52 determine changeable pixels step
53 determine pixels to be changed step
54 store final result step
60 define initial dither bitmap
61 interchange pixel step
62 compute new visual cost step
63 calculate values step
64 compare values step
65 accept change step
66 interchange pixels step
67 reduce T step
68 process completed test step
69 store final result step
70 Gaussian probability function
84 dither LUT selector
86 dither LUTs
92 partially correlated multi-level dither bitmaps

We claim:

1. A method for halftoning a digital image having an x,y array of pixels each having an associated input pixel value, comprising the steps of:

a. providing a memory containing a dither bitmap for each input pixel value of the digital image where the dither bitmaps are partially correlated, by "partially correlated" it is meant that the dither bitmap for any particular input level is more correlated with dither bit maps at adjacent input levels and less correlated with dither bitmaps at more distant input levels, whereby once a pixel is turned on or off, it is more likely to remain on or off for nearby input levels and less likely to remain so for more distant input levels;

b. selecting a dither bitmap corresponding to the input pixel value for a pixel in said digital image;

c. modularly addressing the selected dither bitmap with the location of said pixel to obtain an output halftone image value;

d. repeating step b and c for each pixel in the digital image.

2. The method of claim 1 where the partially correlated dither bitmaps represent random non-deterministic non-white noise patterns.

3. The method of claim 1 where the partially correlated dither bitmaps are designed to minimize a visual cost function.

4. The method of claim 3 where the visual cost function comprises a combination of frequency components of a dither bitmap frequency spectrum computed from the dither bitmap where the frequency components have been weighted by a human visual system sensitivity function.

5. The method of claim 4 where the combination of frequency components of a dither bitmap frequency spectrum is given by:

$$\text{cost} = \sum_{i=0}^{M_x-1} \sum_{j=0}^{M_y-1} |B_{ij} V_{ij}|^2,$$

where $B_{ij}$ is the (i,j)th element of the dither bitmap frequency spectrum, and $V_{ij}$ is the human visual system sensitivity for the frequency corresponding to element (i,j).

6. The method of claim 3 where the visual cost function is minimized by a stochastic annealing process.

7. The method of claim 3 where the visual cost function is minimized by a genetic algorithm.

8. The method of claim 3 where the visual cost function is minimized for each input pixel value in a sequence of input pixel values.

9. The method of claim 3 wherein the partially correlated dither bitmaps are designed by designating a set of changeable dither bitmap pixels in accordance with a correlation interval while minimizing the visual cost function.

10. The method of claim 9 where the changeable dither bitmap pixels correspond to the dither bitmap pixels whose value has not changed within the correlation interval.

11. The method of claim 9 where the changeable dither bitmap pixels are determined using a probability function associated with the correlation interval.

12. The method of claim 9 where the visual cost function is minimized by determining which of the changeable dither bitmap pixels in the dither bitmap for a certain input level can be changed to produce a smallest visual cost value.

13. The method of claim 3 where the visual cost function incorporates a dot reproduction model for an output device intended to be used to print the output halftone image.

14. The method of claim 1 where the partially correlated dither bitmaps have an associated correlation interval.

15. A method for halftoning a digital color image having an x,y array of pixels for a plurality of color channels, where the method of claim 1 is used to halftone each of the color channels of the digital color image.

16. A method for halftoning a digital image having an x,y array of pixels each having an associated input pixel value, comprising the steps of:
   a. providing a memory containing a dither LUT for each pixel position in a dither matrix, where the dither LUTs produce halftone patterns that are partially correlated, by "partially correlated" it is meant that the dither bitmap for any particular input level is more correlated with dither bit maps at adjacent input levels and less correlated with dither bitmaps at more distant input levels, whereby once a pixel is turned on or off, it is more likely to remain on or off for nearby input levels and less likely to remain so for more distant input levels;
   b. selecting a dither LUT corresponding to the location of an input pixel in said digital image by modularly addressing a dither LUT selector;
   c. addressing the selected dither LUT with the input pixel value to obtain an output halftone image value;
   d. repeating step b and c for each pixel in the digital image.

17. A method for halftoning a digital color image having an x,y array of input pixel values for a plurality of color channels, comprising the steps of:
   a. providing a memory containing a dither bitmap for each input pixel value and for each color channel of the digital color image where the dither bitmaps are partially correlated, by "partially correlated" it is meant that the dither bitmap for any particular input level is more correlated with dither bit maps at adjacent input levels and less correlated with dither bitmaps at more distant input levels, whereby once a pixel is turned on or off, it is more likely to remain on or off for nearby input levels and less likely to remain so for more distant input levels;
   b. for each color channel selecting the dither bitmap corresponding to the input pixel value for a pixel in said digital image;
   c. for each color channel modularly addressing the selected dither bitmap with the location of said pixel to obtain an output halftone image value;
   d. repeating step b and c for each pixel in the digital image.

18. A method for multilevel halftoning a digital image having an x,y array of pixels each having an associated input pixel value, comprising the steps of:
   a. providing a memory containing a multilevel dither bitmap for each input pixel value of the digital image where the multilevel dither bitmaps are partially correlated, by "partially correlated" it is meant that the dither bitmap for any particular input level is more correlated with dither bit maps at adjacent input levels and less correlated with dither bitmaps at more distant input levels, whereby once a pixel is turned on or off, it is more likely to remain on or off for nearby input levels and less likely to remain so for more distant input levels;
   b. selecting a multilevel dither bitmap corresponding to the input pixel value for a pixel in said digital image;
   c. modularly addressing the selected multilevel dither bitmap with the location of said pixel to obtain an output halftone image value;
   d. repeating step b and c for each pixel in the digital image.

* * * * *